United States Patent
Fehrer et al.

(10) Patent No.: US 8,879,135 B2
(45) Date of Patent: Nov. 4, 2014

(54) DEVICE AND METHOD FOR DEFLECTING A LIGHT BEAM IN TWO DIFFERENT DIRECTIONS AND SCANNING MICROSCOPE

(75) Inventors: Dirk-Oliver Fehrer, Bad Schoenborn (DE); Ingo Boehm, Heidelberg (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 13/503,436

(22) PCT Filed: Aug. 27, 2010

(86) PCT No.: PCT/EP2010/062532
§ 371 (c)(1),
(2), (4) Date: Apr. 23, 2012

(87) PCT Pub. No.: WO2011/047911
PCT Pub. Date: Apr. 28, 2011

(65) Prior Publication Data
US 2012/0212790 A1    Aug. 23, 2012

(30) Foreign Application Priority Data
Oct. 23, 2009  (DE) .......................... 10 2009 050 340

(51) Int. Cl.
G02B 26/08    (2006.01)
G02B 26/10    (2006.01)
G02B 26/12    (2006.01)
G02B 7/182    (2006.01)
G02B 21/00    (2006.01)

(52) U.S. Cl.
CPC .......... *G02B 21/0048* (2013.01); *G02B 7/1821* (2013.01); *G02B 26/101* (2013.01)
USPC ................... 359/212.1; 359/202.1; 359/223.1

(58) Field of Classification Search
USPC ........... 359/196.1–226.3, 290–295, 838, 846, 359/871–872, 904; 250/204, 559.06, 250/559.29, 230, 234; 347/255–260; 353/39, 98–99; 385/15–18, 22; 398/12, 398/19, 45
See application file for complete search history.

(56) References Cited

U.S. PATENT DOCUMENTS

| | | |
|---|---|---|
| 6,211,988 B1 | 4/2001 | Engelhardt et al. |
| 2008/0074621 A1 | 3/2008 | Ichikawa et al. |

(Continued)

FOREIGN PATENT DOCUMENTS

| | | |
|---|---|---|
| DE | 3232953 A1 | 3/1984 |
| DE | 19654210 A1 | 6/1998 |
| DE | 10209322 A1 | 9/2003 |
| DE | 102005042672 A1 | 3/2007 |
| DE | 102008001071 A1 | 10/2009 |

(Continued)

*Primary Examiner* — Stephone B Allen
*Assistant Examiner* — Kimberly N Kakalec
(74) *Attorney, Agent, or Firm* — Leydig, Voit & Mayer, Ltd.

(57) ABSTRACT

A device for deflecting a light beam in two different directions includes a mirror and a first rotating actuator element configured to rotate about a first axis as a function of a first actuation signal. A second rotating actuator element is disposed opposite to the first rotating actuator element along the first axis and configured to rotate about the first axis as a function of a second actuation signal. A first spring element is connected to the first rotating actuator element and, off-axially with respect to the first axis at a predetermined first distance thereto, to the mirror in a rest position of the mirror. A second spring element is connected to the second rotating actuator element and to the mirror.

15 Claims, 4 Drawing Sheets

(56) References Cited

U.S. PATENT DOCUMENTS

| | | |
|---|---|---|
| 2008/0180791 A1 | 7/2008 | Schreiber et al. |
| 2008/0239252 A1* | 10/2008 | Konno et al. .................. 353/98 |
| 2008/0297868 A1 | 12/2008 | Mizumoto |
| 2009/0284818 A1* | 11/2009 | Maekawa .................. 359/221.2 |

FOREIGN PATENT DOCUMENTS

| | | |
|---|---|---|
| JP | 2003043385 A | 2/2003 |
| JP | 2003090977 A | 3/2003 |
| JP | 2003167211 A | 6/2003 |
| WO | WO 2009081858 A1 | 7/2009 |

* cited by examiner

DEVICE AND METHOD FOR DEFLECTING A LIGHT BEAM IN TWO DIFFERENT DIRECTIONS AND SCANNING MICROSCOPE

CROSS-REFERENCE TO PRIOR APPLICATIONS

This application is a U.S. National Phase application under 35 U.S.C. §371 of International Application No. PCT/EP2010/062532, filed on Aug. 27, 2010, and claims benefit to German Patent Application No. DE 10 2009 050 340.4, filed on Oct. 23, 2009. The International Application was published in German on Apr. 28, 2011 as WO 2011/047911 under PCT Article 21(2).

FIELD

The invention relates to a device for deflecting a light beam in two different directions. The invention furthermore relates to a scanning microscope which comprises the device for deflecting the light beam in two different directions and to a method for deflecting a light beam in two different directions.

BACKGROUND

In the case of a scanning microscope, an illumination light beam is focused on a region of a sample to be examined, for example via a plurality of mirrors and with the aid of a focusing optical system. The detection light emanating from the region to be examined is detected by means of a detector. Actuator elements are used to tilt mirrors in an oscillatory manner, bringing about a deflection of the illumination light beam, and so a sample can be scanned by means of the illumination light beam. Here, the illumination light beam is deflected such that the focus of the illumination light beam is successively directed at adjacent regions to be examined. The image data captured in the process are stored and combined by means of an image generation unit in order to form an overall image of the entire examined region.

DE 102 09 322 A1 has disclosed a device for deflecting a light beam in a scanning microscope. The device has a unit which is rotatable about a first axis and contains two reflection surfaces that are stationary with respect to one another. The first rotatable unit receives a light beam and routes it to a third reflection surface that is rotatable about a second axis, which runs perpendicular to the first rotational axis. The device comprises at least three mirrors and at least three rotating actuator elements, one of which oscillates about its rest position.

DE 196 54 210 C2 has disclosed an optical arrangement for scanning a sample along two axes that lie substantially perpendicular to one another. The optical arrangement comprises three mirrors, two of which are connected to a first oscillating rotating actuator element and one of which is connected to a second oscillating rotating actuator element.

Thus, the known scanning devices have more than two mirrors and at least two actuator elements. As a result of the plurality of mirrors, the scanning devices are not very compact and expensive to produce because the mirrors have to be matched, i.e. adjusted, to one another. Furthermore, when the mirrors are tilted, the plurality of mirrors results in a beam offset with respect to a reference beam path in the rest position of the mirrors.

SUMMARY

In an embodiment the present invention provides a device for deflecting a light beam in two different directions including a mirror and a first rotating actuator element configured to rotate about a first axis as a function of a first actuation signal. A second rotating actuator element is disposed opposite to the first rotating actuator element along the first axis and configured to rotate about the first axis as a function of a second actuation signal. A first spring element is connected to the first rotating actuator element and, off-axially with respect to the first axis at a predetermined first distance thereto, to the mirror in a rest position of the mirror. A second spring element is connected to the second rotating actuator element and to the mirror.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

Figure 1:
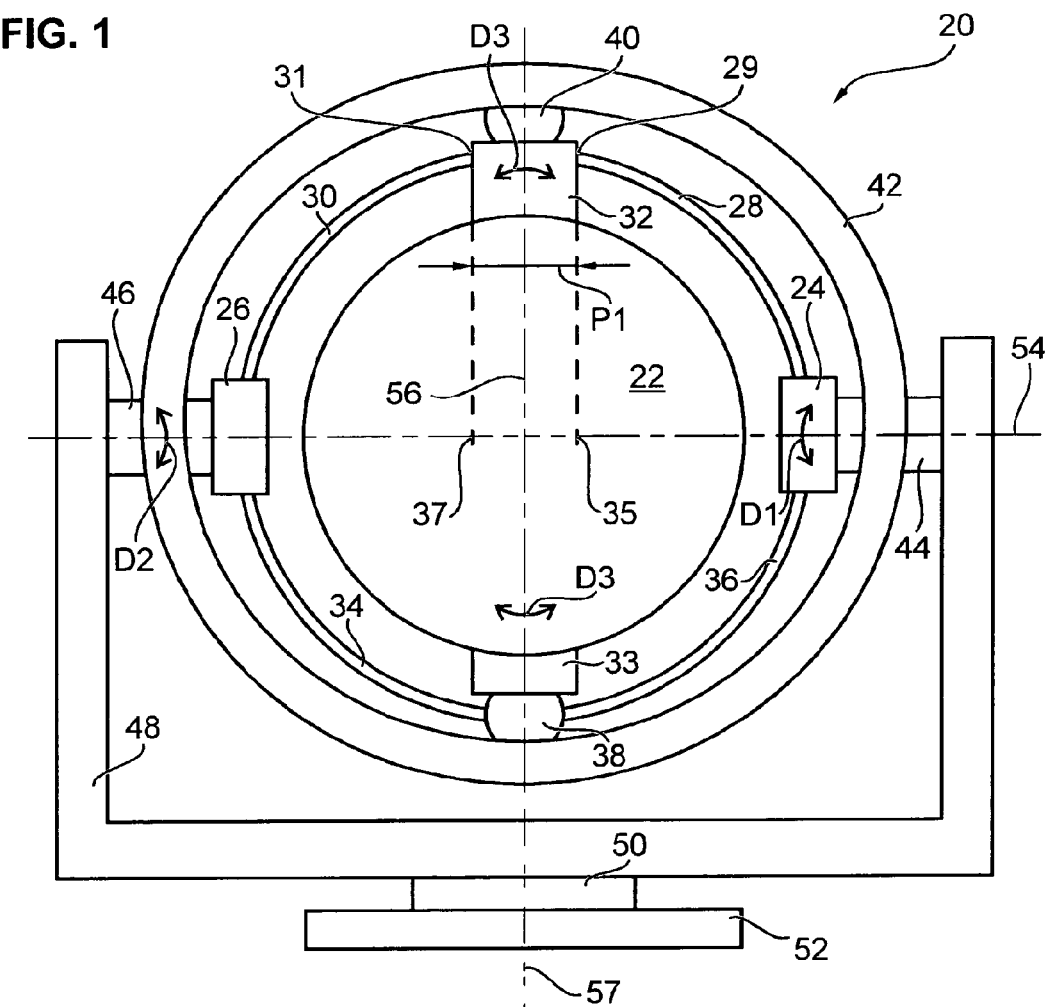
FIG. 1 shows a first embodiment of the device for deflecting a light beam.

Elements with the same design or function are, in a Figure-overarching manner, denoted by the same reference signs.

DETAILED DESCRIPTION

It is an aspect of the invention to develop a device and a method for deflecting a light beam in two different directions, and a scanning microscope, which merely require one mirror and which can be produced or carried out in a particularly compact and cost-effective manner.

According to a first aspect, an embodiment of the invention relates to a device for deflecting a light beam in two different directions. The device comprises a mirror, which is connected to a first rotating actuator element. The first rotating actuator element rotates about a first axis as a function of a first actuation signal. In addition to the first rotating actuator element, provision is made for a second rotating actuator element. An embodiment of the invention is distinguished by virtue of the fact that the second rotating actuator element is arranged opposite to the first rotating actuator element along the first axis and rotates about the first axis as a function of a second actuation signal, and that the first rotating actuator element is, off-axially with respect to the first axis at a predetermined first distance thereto, connected to the mirror via a first spring element and that the second rotating actuator element is connected to the mirror via a second spring element.

Actuating the rotating actuator elements initiates a rotation of the rotating actuator elements about the first axis. This brings about an elastic deformation of the spring elements, which then transfer a force onto the mirror. In the case of actuation of the same form and non-phase-shifted actuation of the two rotating actuator elements, arranging the two rotating actuator elements along the first axis causes a torque to act on the mirror, which torque is parallel to the first axis and brings about a rotation of the mirror solely about the first axis.

Thus, in the following text, the non-phase-shifted actuation and the non-phase-shifted actuation signals are understood to mean precisely the actuation or precisely the actuation signals which, in the case of the corresponding actuation signals being of the same form, bring about the rotation of the mirror solely about the first axis. Depending on the design and arrangement of the rotating actuator elements, this may require the interposition of a component that brings about a phase jump of 180°.

Connecting the first spring element to the mirror off-axially with respect to the first axis causes a torque in the case of actuation not of the same form and/or phase-shifted actuation of the rotating actuator elements, which torque is at least partly nonparallel to the first axis and hence acts on the mirror such that the mirror rotates about a second axis that lies off-axially with respect to the first axis. In particular, the spring elements can be connected to the mirror off-axially with respect to the first axis and the rotating actuator elements can be actuated such that the second axis is perpendicular to the first axis.

If the light beam is now directed at the mirror, a light point, created by the light beam and deflected by means of the mirror, is deflected in a first direction by tilting the mirror about the first axis and deflected in a second direction by tilting the mirror about the second axis, which second direction more particularly is perpendicular to the first direction if the second axis is perpendicular to the first axis. If one of the two rotating actuator elements or both rotating actuator elements are now actuated such that at least one of the two rotating actuator elements oscillates about its rest position, the light point also moves to-and-fro, for example in the first direction. The linear region optically scanned thereby can be displaced in the second direction in the case of suitable actuation of the rotating actuator elements, and so, overall, it is possible to optically scan a two-dimensional region. In the case of suitable actuation of the rotating actuator elements, the light point can, for example, then optically scan a meandering or z-shaped region; in particular, it is possible to scan a sample in a meandering or z-shaped manner.

Compared to known scanning devices for deflecting a light beam, more particularly a light point created thereby, in two different, e.g. perpendicular, directions, it is possible to dispense with at least two mirrors. As a result, the device can be produced in a particularly small, compact and cost-effective manner because the scanning device then has fewer components and the mirrors need not be matched to one another and adjusted with respect to one another. If the light beam is incident on the mirror in the rotational center of the latter, the position of the light beam on the mirror moreover does not change when the mirror is tilted, as a result of which there is no beam offset as in e.g. a polygon mirror scanner (multiple-mirror scanner).

In this context, the actuation signals being of the same form means that an amplitude and a frequency of the actuation signals is the same. By way of example, the actuation signals may be sinusoidal, saw-tooth, rectangular or step-like in this case. Furthermore, differently formed signals can be superposed. In this context, the two actuation signals being phase-shifted with respect to one another means that there is a phase shift between the first and the second actuation signal. A sense of rotation, according to which the actuator elements rotate about the first axis, is defined in this context such that both actuator elements have the same sense of rotation if they rotate in the same direction with respect to the first axis. Thus, the sense of rotation relates to a fixed external reference system. The predetermined first distance is at least greater than zero.

In an advantageous embodiment the second rotating actuator element is also connected to the mirror off-axially with respect to the first axis at a predetermined second distance thereto, as a result of which a torsional stress on the second spring element is reduced. Alternatively, or in addition thereto, the first spring element is connected to the mirror at a first contact point and the second spring element is connected to the mirror at a second contact point, with a projection point of the first contact point on the first axis having a predetermined third distance to a projection point of a second contact point on the first axis. Alternatively, or in addition thereto, the contact points are arranged such that in respect of a plane, which is spanned by the first axis and a surface normal in the center of the mirror in the rest position of the mirror, they lie on the same side. The contact points which are spaced apart from one another with respect to the first axis and the contact points lying on one side of the plane can, individually or in combination, contribute to the fact that the second axis is precisely perpendicular to the first axis. This also contributes to the two directions into which the light beam is deflected being substantially perpendicular to one another.

In a further advantageous embodiment, the device comprises a third spring element, which is connected to the first rotating actuator element and, off-axially with respect to the axis at a predetermined fourth distance thereto, to the mirror, and/or a fourth spring element, which is connected to the second rotating actuator element and, off-axially with respect to the first axis at a predetermined fifth distance thereto, to the mirror. The two additional spring elements contribute to the movement of the mirror being particularly precise because they have a holding and guiding function. The effect of this is that the light beam and, more particularly, the light point can be deflected in a very precise manner.

An outer guide element is preferably arranged, which has two recesses, which are formed concentrically with respect to the first axis and respectively in the radial direction surround at least part of the rotating actuator elements or a holder of the rotating actuator elements. The outer guide element is coupled to the mount of the mirror via respectively one pivot bearing, which is arranged along the second axis. The outer guide element affords the possibility of guiding the movement of the mirror in a particularly precise manner and thus of deflecting the light beam particularly precisely in the two different directions.

By arranging a third rotating actuator element which, as a function of a third actuation signal, rotates the first and the second rotating actuator element, and hence the mirror which is held by the two rotating actuator elements, about a third axis, it is possible to rotate the mirror about a third axis which, in the rest position of the mirror, is perpendicular to the first axis. This affords the possibility of obtaining any scanning pattern in addition to the meandering form and/or of scanning complicatedly formed regions in a precise manner. In particular, the whole scanning field can be rotated. Compared to known scanning devices in which the scanning field can be rotated, it is thus possible to dispense with up to five mirrors.

According to a second aspect, an embodiment of the invention is distinguished by a scanning microscope which, in order to deflect a light beam, more particularly an illumination light beam, comprises the device for deflecting the light beam.

According to a third aspect, an embodiment of the invention is distinguished by virtue of the fact that the light beam is deflected in the first direction by the two actuation signals from the rotating actuator elements being of the same form and not having a phase shift with respect to one another, and by virtue of the fact that the mirror is rotated about the second axis when the two actuation signals are not of the same form and/or have a phase shift with respect to one another.

FIG. 1 shows a first embodiment of a device for deflecting a light beam in two different directions, comprising a mirror 22 that is connected to a first rotating actuator element 24 via a first spring element 28 and to a second rotating actuator element 26 via a second spring element 30. The first rotating actuator element 24 is connected to the mirror 22 via the first spring element 28 and via a first mount 32. With respect to the mirror 22, the second rotating actuator element 26 is arranged opposite to the first rotating actuator element 24 and connected to the mirror 22 via the second spring element 30 and the mount 32. Additionally, a third spring element 36 and a fourth spring element 34 are also arranged; these connect the first rotating actuator element 24 and the second rotating actuator element 26, respectively, to a second mount 33 via a first pivot bearing 38. The first pivot bearing 38 is a moveable connection between the second mount 33 and an outer guide element 42. A second pivot bearing 40 is arranged opposite to the first pivot bearing 38. The second pivot bearing 40 is a moveable connection between the first mount 32 and the outer guide element 42.

The two rotating actuator elements 24, 26 are connected via a holder 44 of the first rotating actuator element 24 connected to a support 48 and a holder 46 of the second rotating actuator element 26 connected to the support 48. The support 48 is connected to a pedestal 52 of the device 20 via a third rotating actuator element 50.

Depending on a first and second actuation signal respectively, the two rotating actuator elements 24, 26 oscillate to-and-fro about a rest position of the corresponding rotating actuator element 24, 26 in accordance with a first double-headed arrow D1 and a second double-headed arrow D2, with the first axis 54 being the rotational axis of the oscillatory motion. The rest position of the rotating actuator elements 24, 26 corresponds to the position of the rotating actuator elements 24, 26 if these are not actuated. If the rotating actuator elements 24, 26 are in the rest position, the mirror 22 is also in its rest position. In the rest position of the mirror 22, a mirror surface of the mirror 22 is parallel to a first plane spanned by the first axis 54 and a second axis 57. The second axis 56 is perpendicular to the first axis 54 and corresponds to a rotational axis that is prescribed by the two pivot bearings 38, 40.

The first rotating actuator element 24 is, via the first and the third spring element 28, 36, connected to the mirror 22 off-axially with respect to the first axis 54 at a predetermined first distance thereto. The second rotating actuator element 26 is, via the second and the fourth spring element 26, 34, connected to the mirror 22 off-axially with respect to the first axis 54 at a predetermined second distance thereto. The first distance corresponds to the second distance. The first spring element 28 is connected to the first mount 32 at a first contact point 29 and the second spring element 30 is connected to the first mount 32 at a second contact point 31. A first projection point 35 emerges by projecting the first contact point 29 onto the first axis 54 in the rest position of the mirror 22. A second projection point 37 emerges by projecting the second contact point 31 onto the first axis 54 in the rest position of the mirror 22. The two projection points 35, 37 are spaced apart on the first axis 54 by a predetermined third distance P1. The first axis 54 and a surface normal perpendicular thereto in the center of the mirror 22 span a plane. In respect of the plane, the two contact points 29, 31 are situated on the same side. The first axis 54 cuts the mirror 22 in the rest position of the mirror 22.

In the region in which the first spring element 28 is coupled to the first rotating actuator element 24, the first spring element 28 is almost perpendicular to the first axis 54. In a region in which the first spring element 28 is connected to the first mount 32, the first spring element 28 is almost parallel to the first axis 54. The second spring element 30 is almost perpendicular to the first axis 54 in a region in which the second spring element 30 is coupled to the second rotating actuator element 26 and is almost parallel to the first axis 54 in a region in which the second spring element 30 is connected to the first mount 32. The spring elements 28, 30, 34, 36 respectively have a circular-segment-shaped design and are arranged concentrically with respect to the mirror 22.

The outer guide element 42 has two recesses (not illustrated) which are formed concentrically with respect to the first axis 54 and respectively in the radial direction surround part of the holders 44, 46 of the rotating actuator elements 24, 26. Hence the mirror 22 is mounted on gimbals.

The pivot bearings 38, 40 are embodied as spheres. The spring elements 28, 30, 34, 36 are formed from spring wire. The two rotating actuator elements 24, 26 are torsional actuator elements, which, for example, operate on galvanometric principles.

In order to deflect the light beam, the light beam is directed at the center of the mirror 22. Rotating the rotating actuator elements 24, 26 brings about an elastic deformation of the spring elements 28, 30, 34, 36. This exerts a force on the mirror 22. If the first and the second rotating actuator element 24, 26 are now actuated as a function of a first and second actuation signal, respectively, such that they have the same sense of rotation in respect of the axis 54, they have the same form of oscillation and, more particularly, the two actuation signals are of the same form and are not phase-shifted with respect to one another, then a torque arises which acts on the mirror and the torque vector of which is parallel to the first axis 54. As a result, the mirror 22 only oscillates about the first axis 54 and about its rest position. This brings about a deflection of the light beam in a first direction. If the two rotating actuator elements 24, 26 are actuated such that the two rotating actuator elements 24, 26 have opposing senses of rotation in respect of the first axis 54 and, more particularly, the two actuation signals are of the same form but phase-shifted by 180° with respect to one another, this causes a torque that acts on the mirror 22 and the torque vector of which is perpendicular to the first axis 54 and parallel to the second axis 56. As a result, the mirror 22 rotates about the second axis 56 in accordance with a third double-headed arrow D3. This brings about a deflection of the light beam in a second direction, which is perpendicular to the first axis 54. Actuating the third rotating actuator element 50 brings about a rotation of the support 48 with the rotating actuator elements 24, 26 and the mirror 22 about a third axis 57. Rotating the support 48 leads to a rotation of the whole surface that can be scanned and hence of the whole scanning field.

Optical scanning of a predetermined surface by means of the light beam can now be achieved by matching the two actuation signals to one another such that the mirror 22 simultaneously tilts about the first and the second axis 54, 56, which brings about a deflection of the light beam in the first and the second direction. To this end, the actuation signals can be not of the same form and/or have a fixed or variable phase shift with respect to one another. Depending on the selection of the amplitudes, the frequencies and the phase shift, it is now possible to realize very different scanning patterns, more particularly a meandering, a z-shaped or a multiple z-shaped scanning pattern.

Thus, compared to known scanning devices for deflecting light beams, all that is required is a mirror 22 and two rotating actuator elements 24, 26, which enables a cost-effective and compact design of the device 20 because fewer mirrors are required. Moreover, a significant amount of adjustment complexity, which is required in the case of multiple-mirror scanners because the plurality of mirrors have to be aligned to one another, is dispensed with. Nor is there a beam offset, which occurs in the case of multiple-mirror scanners, if the light beam impacts the mirror 22 at the center of rotation.

In the following FIGS. 2 to 6, exemplary embodiments of the device 20 for deflecting the light beam in two different directions are illustrated, in which, compared to the example according to FIG. 1, various structural parts have not been arranged.

Figure 2:
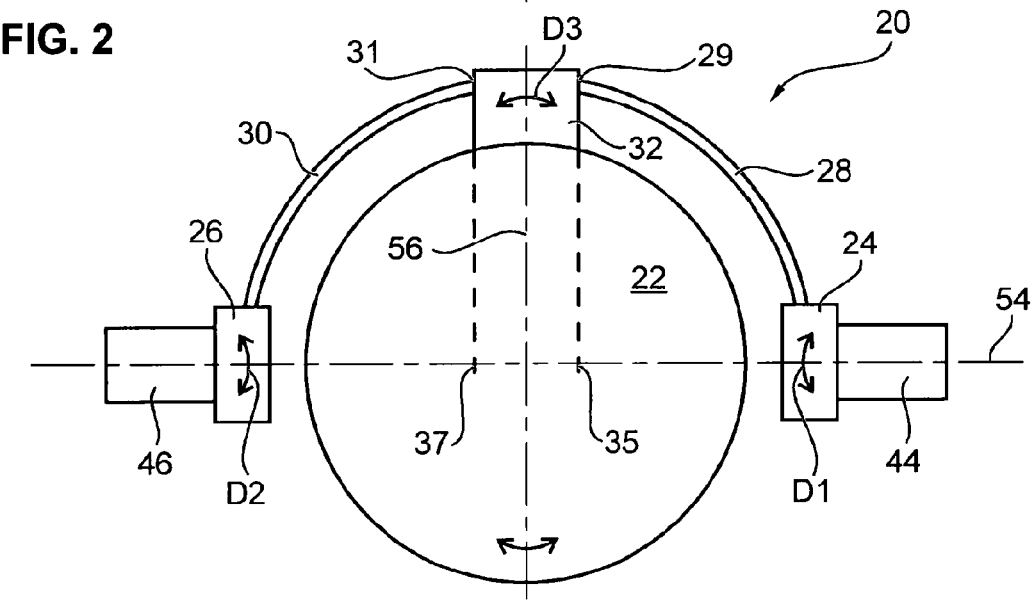
FIG. 2 shows a second embodiment of the device for deflecting the light beam.

Compared to the first embodiment, the second embodiment, which is shown in FIG. 2, has neither a third nor a fourth spring element 34, 36, and does not have an outer guide element 42 either. Here, the first and the second spring element 28, 30 have a particularly stable design. Hence, further components can be dispensed with compared to the first embodiment, as a result of which the production costs can be further reduced. Furthermore, the mirror can move more freely because the second axis 56 is not fixed by the two pivot bearings 38, 40 but rather emerges from the torque that is transmitted onto the mirror 22 via the two spring elements 28, 30. Otherwise the functionality of the second embodiment corresponds to that of the first embodiment; in particular, the mirror 22 oscillates about its rest position about the first axis if the two actuation signals are of the same form and of the same phase, and it oscillates about the second axis 56 if the two actuation signals are of the same form and have a phase shift of 180° with respect to one another. Furthermore, the scanning field can be optically scanned by deflecting the light beam by virtue of superposing the two actuation signals in a suitable manner.

Figure 3:
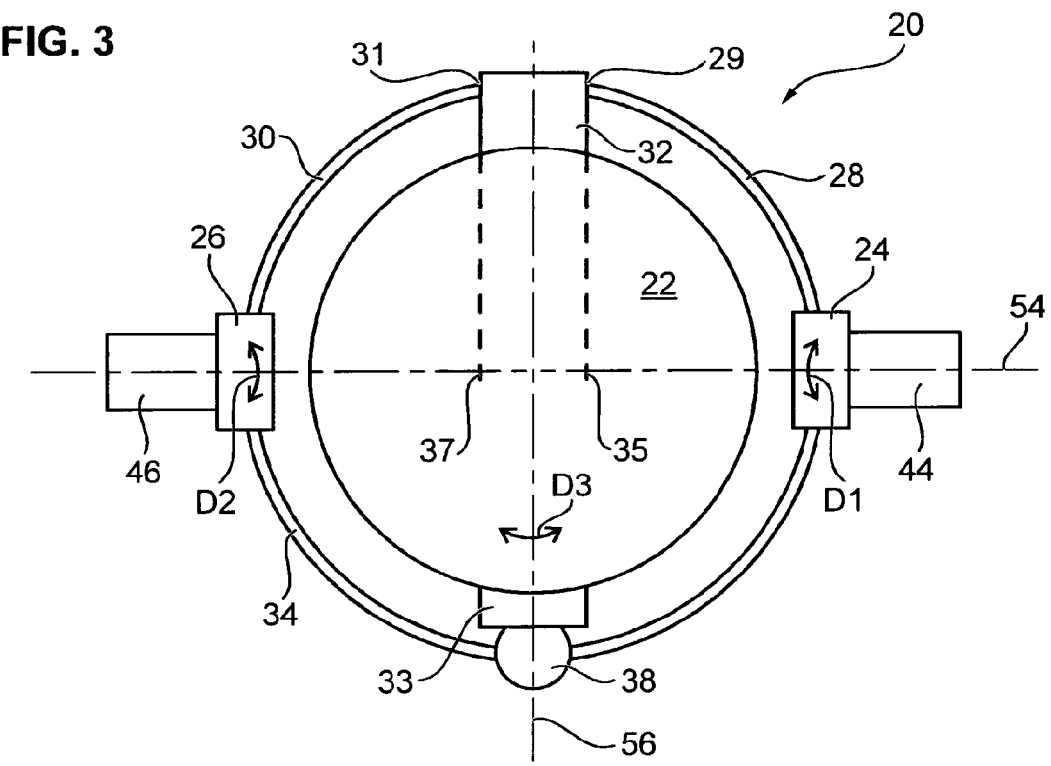
FIG. 3 shows a third embodiment of the device for deflecting the light beam.

Compared to the first embodiment, the third embodiment, which is shown in FIG. 3, does not have an outer guide element 42. The third and the fourth guide element 36, 34 are connected to the first and second mount 32, 33 respectively via the first pivot bearing 38. The second axis 56 is fixed in the region of the first pivot bearing 38 by the first pivot bearing 38, but it can, depending on the actuation in the region of the first mount 32, tilt with respect to the second axis 56 in the rest position of the mirror 22. Therefore the mirror 22 has more freedom of motion in the third embodiment than in the first embodiment and, compared to the first embodiment, the outer guide element can be dispensed with. Furthermore, the mirror 22 has less freedom of motion in the third embodiment than in the second embodiment and the light beam can be deflected more precisely than in the second embodiment. The functionality of the third embodiment in respect of the actuation of the rotating actuator elements 24, 26 corresponds to the functionalities of the embodiments explained above.

Figure 4:
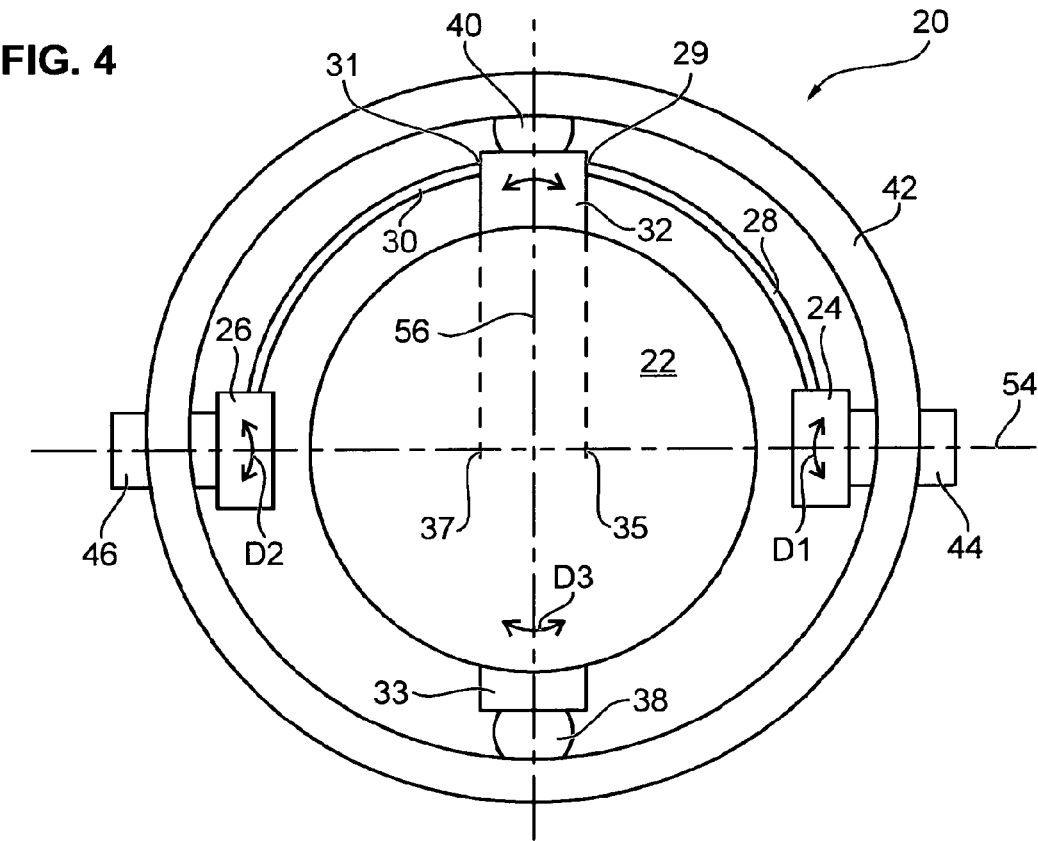
FIG. 4 shows a fourth embodiment of the device for deflecting the light beam.

Compared to the first embodiment, the fourth embodiment 4, which is shown in FIG. 4, has neither a third nor a fourth guide element 36, 34. The mirror 22 has the same freedom of motion as in the first embodiment because the first and the second axis 54, 56 are fixed by the rotating actuator elements 24, 26 and by the two pivot bearings 38, 40. Compared to the first embodiment, there is less resistance on the rotating actuator elements 24, 26 as a result of the missing third and fourth guide element 36, 34. The functionality of the fourth embodiment in respect of the actuation of the rotating actuator elements 24, 26 corresponds to the functionalities of the embodiments explained above.

Figure 5:
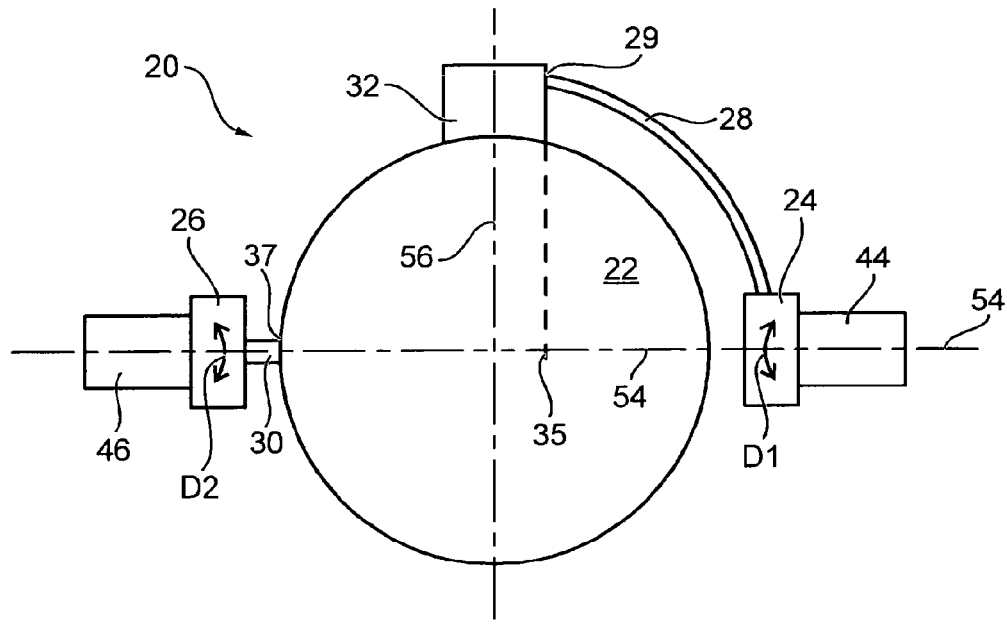
FIG. 5 shows a fifth embodiment of the device for deflecting the light beam.

Compared to the first embodiment, the second rotating actuator element 26 is connected to the mirror in the continuation of the first axis 54 in the fifth embodiment, which is shown in FIG. 5, and the fifth embodiment does not have a third or a fourth spring element 36, 34 either and it does not have an outer guide element 42. Hence costs are reduced in this embodiment compared to the first embodiment because fewer components are arranged. If the first and second rotating actuator elements 28, 30 are actuated not in the same form or in a phase-shifted manner, the mirror 22 rotates about an axis that deviates from the second axis 56 shown in FIG. 5. If the two rotating actuator elements are actuated in the same form and with the same phase, the mirror 22 rotates about the first axis 54. The functionality of the fifth embodiment in respect of the actuation of the rotating actuator elements 24, 26 substantially corresponds to the functionalities of the embodiments explained above, wherein, in order to deflect the light beam precisely, it is taken into account that, depending on the actuation, the actual rotational axis of the mirror 22 may deviate from the second axis 56.

Figure 6:
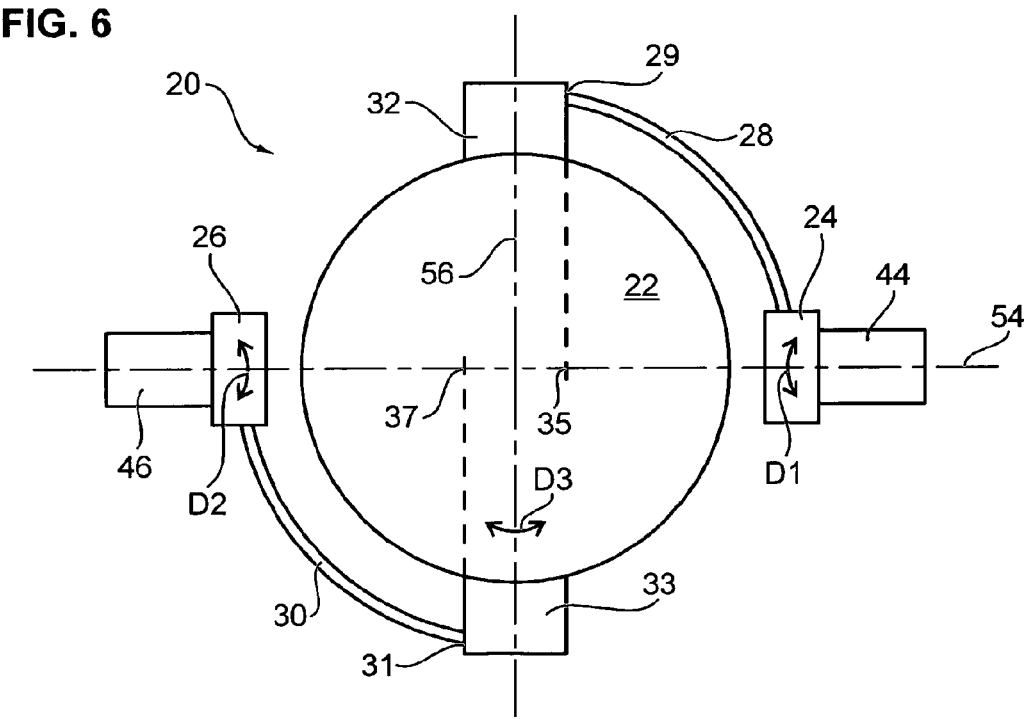
FIG. 6 shows a sixth embodiment of the device for deflecting the light beam.

In the sixth embodiment, which is shown in FIG. 6, the second spring element 30 is connected to the second mount 33 on the opposite side to the first spring element 28 with respect to the plane that is spanned by the first axis 54 and the surface normal in the center of the mirror 22 in the rest position of the mirror 22. In this embodiment too, the actual rotational axis of the mirror 22 may no longer be precisely perpendicular to the first axis 54, depending on the position of the two rotating actuator elements 24, 26 during the oscillating to-and-fro movement about the rest position of the corresponding rotating actuator element 24, 26. In particular, the position of the actual rotational axis may vary depending on the actuation of the rotating actuator elements 24, 26. This may lead to the scanning pattern not being precisely meandering, z-shaped or multiple z-shaped. However, this deviation can be accounted for in the current signal for actuating the two rotating actuator elements 24, 26 such that optical scanning of a predetermined surface nevertheless is possible with the aid of the deflected light beam.

Alternatively, all embodiments can also be designed without the first and the second mount 32, 33. In this case, the spring elements 28, 30, 34, 36 are for example connected directly to the mirror. Furthermore, the two mounts 32, 33 can have an integral design. As an alternative to one or both spherical pivot bearings 38, 40, other bearings may be arranged, which fix the second axis 56 as the actual rotational axis of the mirror 22 and enable the rotation of the mirror 22 about the second axis 56.

Figure 7:
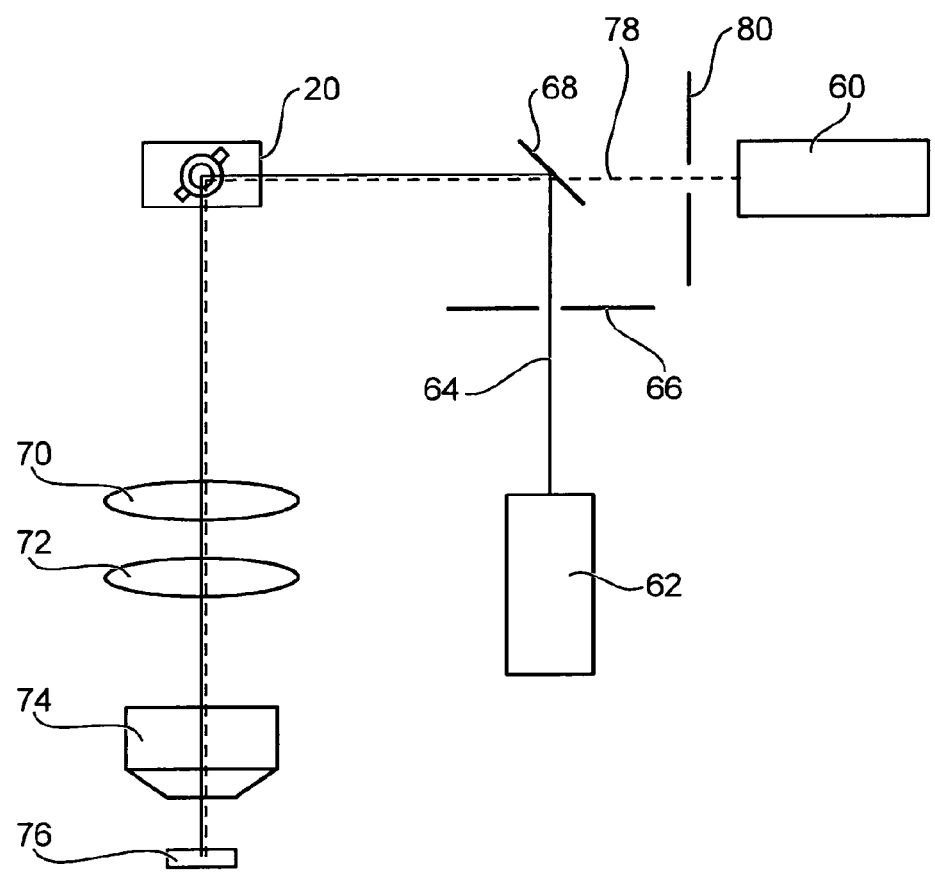
FIG. 7 shows a scanning microscope with the device for deflecting the light beam.

FIG. 7 shows a scanning microscope with a light source 62, for example a laser, with a detector 60 and with the device 20 for deflecting the light beam in two different directions. The scanning microscope is embodied as confocal scanning microscope. The light source 62 emits an illumination light beam 64. The illumination light beam 64 is focused on a first aperture 66 and is directed at the device 20 via a main beam splitter 68, which for example comprises a dichroic mirror. The device 20 guides the illumination light beam 64 via a scanning optical system 70 and via a tube optical system 72 onto a focusing optical system 74, which focuses the illumination light beam 64 onto a sample 76. A detection light beam 78 emanating from the sample 76 follows the beam path of the illumination light beam 64 in the reverse direction up until the main beam splitter 68. The latter splits the detection light beam 78 and the illumination light beam 64. The detection light beam 78 impinges on the detector 60 via a second aperture 80.

By actuating the two rotating actuator elements 24, 26 according to the manner explained above, the sample 76 is optically sampled and thus scanned with the aid of the illumination light beam 64 which was deflected by the device 20. In particular, the two rotating actuator elements 24, 26 are actuated oscillating about their rest position such that an illumination point generated by means of the illumination light beam 64 passes over a two-dimensional region on the sample 76 along a plurality of adjacent lines, e.g. 200 lines, and thus optically scans the two-dimensional region of the sample 76. The two-dimensional region can also be referred to as scanning field. A maximum rotational angle through which respectively one of the two rotating actuator elements 24, 26 rotates out of its rest position may for example be in a range between +4° to +12° and/or −4° to −12°. A frequency at which one or both rotating actuator elements 24, 26 oscillate about their rest position may for example lie between 500 and 1500 Hz. As an alternative to the spring wire, one or more of the spring elements 28, 30, 34, 36 may be formed from spring steel. Furthermore, only one of the two rotating actuator elements 24, 26 or both rotating actuator elements 24, 26 may be formed not as an oscillation element operating on galvanometric principles.

The invention is not restricted to the specified exemplary embodiments. In particular, a host of different embodiments are feasible, in which at least one of the spring elements 28, 30, 34, 36 is connected to the mirror 22 off-axially with respect to the first axis 54, such that, in principle, it is possible that in addition to the torque parallel to the first axis 54 a torque that is not parallel to the first axis 54 can act on the mirror 22 and so the light beam can be deflected in the second direction, which is not parallel to the first direction but need not be perpendicular to the first axis 54 either. Furthermore, the device 20 for deflecting the light beam in two different directions can, as an alternative to the scanning microscope, be used in laser projectors, in laser material processing, for laser engraving, in laser copiers or laser scanners.

LIST OF REFERENCE SIGNS

20 Device for Deflecting a Light Beam
22 Mirror
24 First Rotating Actuator Element
26 Second Rotating Actuator Element
28 First Spring Element
29 First Contact Point
30 Second Spring Element
31 Second Contact Point
32 First Mount
33 Second Mount
34 Fourth Spring Element
35 First Projection Point
36 Third Spring Element
37 Second Projection Point
38 First Pivot Bearing
40 Second Pivot Bearing
42 Outer Guide Element
44 Holder of the First Rotating Actuator Element
46 Holder of the Second Rotating Actuator Element
48 Support
50 Third Rotating Actuator Element
52 Pedestal
54 First Axis
56 Second Axis
57 Third Axis
60 Detector
62 Light Source
64 Illumination Light Beam
66 First Aperture
68 Main Beam Splitter
70 Scanning Optical System
72 Tube Optical System
74 Focusing Optical System
76 Sample
78 Detection Light Beam
80 Second Aperture
P1 Third Distance
D1 First Double-Headed Arrow
D2 Second Double-Headed Arrow
D3 Third Double-Headed Arrow

The invention claimed is:

1. A device for deflecting a light beam in two different directions, comprising:
   a mirror;
   a first rotating actuator element configured to rotate about a first axis as a function of a first actuation signal;
   a second rotating actuator element disposed opposite to the first rotating actuator element along the first axis and configured to rotate about the first axis as a function of a second actuation signal;
   a first spring element connected to the first rotating actuator element and, off-axially with respect to the first axis at a predetermined first distance thereto, to the mirror in a rest position of the mirror; and
   a second spring element connected to the second rotating actuator element and to the mirror, so that the mirror is rotatable about the first axis when the first and second actuation signals have a same form and do not have a phase shift with respect to one another and rotatable about a second axis that is different from the first axis when the first and second actuation signals have at least one of a different form and a phase shift with respect to one another.

2. The device according to claim 1, wherein the second rotating actuator element is connected to the mirror off-axially with respect to the first axis at a predetermined second distance thereto.

3. The device according to claim 1, wherein the first spring element is connected to the mirror at a first contact point and the second spring element is connected to the mirror at a second contact point, and wherein a projection point of the first contact point on the first axis is disposed at a predetermined third distance from a projection point of the second contact point on the first axis.

4. The device according to claim 1, wherein the first spring element is connected to the mirror at a first contact point and the second spring element is connected to the mirror at a second contact point, wherein the first axis and a surface normal in the center of the mirror span a plane in the rest position of the mirror, and wherein the first and second contact points lie on the same side in respect of the plane.

5. The device according to claim 1, wherein at least one of the first and the second spring element is connected to the mirror via a mount.

6. The device according to claim 1, wherein the first axis cuts at least one of the mirror and the mount in the rest position of the mirror.

7. The device according to claim 1, wherein the first spring element is substantially perpendicular to the first axis in a region in which the first spring element is coupled to the first rotating actuator element, and is substantially parallel to the first axis in a region in which the first spring element is connected to the mirror or to a mount of the mirror.

8. The device according to claim 1, wherein the second spring element is substantially perpendicular to the first axis in a region in which the second spring element is coupled to the second rotating actuator element, substantially parallel to the first axis in a region in which the second spring element is connected to the mirror or to a mount of the mirror.

9. The device according to claim 1, further comprising at least one of:
   a third spring element connected to the first rotating actuator element, and, off-axially with respect to the first axis at a predetermined fifth distance thereto, to the mirror; and
   a fourth spring element connected to the second rotating actuator element and, off-axially with respect to the first axis at a predetermined fifth distance thereto, to the mirror.

10. The device according to claim 1, further comprising an outer guide element having two recesses which are formed concentrically with respect to the first axis and respectively in a radial direction surround at least part of the rotating actuator elements or a holder of the rotating actuator elements, the outer guide element being coupled to a mount of the mirror via respective pivot bearings disposed along the second axis.

11. The device according to claim 10, further comprising at least one of:
   a third spring element connected to the first rotating actuator element, and, off-axially with respect to the first axis at a predetermined fifth distance thereto, to the mirror; and
   a fourth spring element connected to the second rotating actuator element and, off-axially with respect to the first axis at a predetermined fifth distance thereto, to the mirror;
   wherein at least one of the third and the fourth spring element is coupled to the mount of the mirror via one of the pivot bearings.

12. The device according to claim 1, further comprising a third rotating actuator element configured to rotate, as a function of a third actuation signal, the first rotating actuator element, the second rotating actuator element, and the mirror, about a third axis which, in the rest position of the mirror, is substantially perpendicular to the first axis.

13. A scanning microscope which comprises the device according to claim 1 for deflecting a light beam.

14. A method for deflecting a light beam in two different directions, comprising:
   directing a light beam at a mirror;
   rotating the mirror about a first axis by actuating, as a function of a first actuation signal, a first rotating actuator element configured to rotate about the first axis and by actuating, as a function of a second actuation signal, a second rotating actuator element, disposed opposite to the first rotating actuator element along the first axis and configured to rotate about the first axis, when the first and second actuation signals have a same form and do not have a phase shift with respect to one another, wherein a first spring element is connected to the first rotating actuator element and, off-axially with respect to the first axis at a predetermined first distance thereto, to the mirror in a rest position of the mirror and wherein a second spring element is connected to the second rotating actuator element and to the mirror; and
   rotating the mirror about a second axis that is different from the first axis when the first and second actuation signals have at least one of a different form and a phase shift with respect to one another.

15. The method according to claim 14, wherein at least one of the first and second actuation signals is varied.

\* \* \* \* \*